United States Patent [19]
Lam

[11] Patent Number: 5,822,598
[45] Date of Patent: Oct. 13, 1998

[54] AUDIO ACTIVITY DETECTION CIRCUIT TO INCREASE BATTERY LIFE IN PORTABLE COMPUTERS

[75] Inventor: Don T. Lam, Fountain Valley, Calif.

[73] Assignee: AST Research, Inc., Irvine, Calif.

[21] Appl. No.: 679,510

[22] Filed: Jul. 12, 1996

[51] Int. Cl.$^6$ ........................................................ G06F 1/26
[52] U.S. Cl. ........................................................ 395/750.06
[58] Field of Search ............................. 395/750, 750.03, 395/750.05, 750.06

[56] References Cited

U.S. PATENT DOCUMENTS

| | | | |
|---|---|---|---|
| 5,167,024 | 11/1992 | Smith et al. ............................. | 395/750 |
| 5,408,668 | 4/1995 | Tornai ..................................... | 395/750 |
| 5,477,476 | 12/1995 | Schanin et al. ......................... | 364/707 |
| 5,483,464 | 1/1996 | Song ...................................... | 364/492 |
| 5,535,400 | 7/1996 | Belmont ................................. | 395/750 |
| 5,546,591 | 8/1996 | Wurzburg et al. ...................... | 395/750 |
| 5,594,672 | 1/1997 | Hicks ..................................... | 364/707 |
| 5,596,756 | 1/1997 | O'Brien ................................. | 395/750 |
| 5,617,571 | 4/1997 | Tanaka ................................... | 395/750 |
| 5,630,144 | 5/1997 | Woog et al. ............................ | 395/750 |

*Primary Examiner*—Glenn A. Auve
*Attorney, Agent, or Firm*—Knobbe, Martens, Olson & Bear, LLP

[57] ABSTRACT

A power management system for a computer system having an audio circuit which generates an audio output signal. An activity detection circuit senses audio signal activity on the analog audio signal. The power management system maintains power to at least the audio circuit when activity is detected on the analog audio circuit by the activity detection circuit. The power management system causes the audio circuit to enter a power conservation mode when no activity is detected by the audio detection circuit on the audio analog signal for a predetermined amount of time.

11 Claims, 3 Drawing Sheets

AUDIO ACTIVITY DETECTION CIRCUIT TO INCREASE BATTERY LIFE IN PORTABLE COMPUTERS

BACKGROUND OF THE INVENTION

1. Field of the Invention

The invention relates to activity detection circuits in computers, and, in particular, to an improved method of detecting audio activity in a computer.

2. Description of the Related Art

Many portable and desktop computers have power conservation modes of operation to reduce either the battery drain, as is desirable for portable computers, or to reduce energy consumption, as is desirable for desktop computers. Generally, a computer incorporating power conservation modes has a power management system which monitors the activity of different subsystems on the computer, such as a disk drive, a display, a CD-ROM drive, or an audio subsystem. The power management system will suspend the operation of a particular subsystem if no activity is sensed on that subsystem for a predetermined amount of time, thus reducing power consumption.

Computer CD-ROM drives typically can access either CD-ROMs, which conform to a first standard, and may contain software application packages, such as multi-media applications including programs and video and/or audio information, or audio CD albums, which conform to a second standard, and primarily contain digital representations of analog music. The technique used by current computer power management systems to determine if the CD-ROM drive is in use, and hence whether the CD-ROM drive is using an audio subsystem of the computer, is to monitor the occurrence of I/O or Direct Memory Access (DMA) transfers between the CD-ROM and the rest of the computer system. This technique provides an accurate indication of CD-ROM drive activity when accessing a CD-ROM, which typically requires the CD-ROM drive to interact with the rest of the computer system by communicating data or commands using DMA or I/O transfers. However, this technique does not work when the CD-ROM drive is playing an audio CD album, such as those used for storing and playing music, because playing music generally does not require any I/O or DMA interactions or transfers with the rest of the computer system. Instead, a CD-ROM drive playing an audio CD album uses a coder-decoder (codec) and an audio amplifier to output an audio signal to a speaker. Thus, if a computer user is playing an audio CD album, the computer management system may incorrectly determine that the CD-ROM drive and audio subsystem are inactive due to the lack of I/O or DMA operations. As a result, the power management system will power-down or suspend operation of the CD-ROM drive and the audio subsystem to conserve energy, even though the CD-ROM drive and the audio subsystem are still in use.

In an alternative power management system used in some computers, the power management system may choose to refrain from suspending the operation of the CD-ROM or the audio subsystem altogether, to avoid the inadvertent interruptions of the CD-ROM and audio subsystem described above. Using this technique, the CD-ROM drive and audio subsystem waste power by operating even when they are not in use.

Additionally, many computer manufactures are beginning to incorporate a standard for video functions, such as tele-video conferencing. The new standard is commonly known as Zoom Video (ZV). There are several different types of ZV port devices contemplated, including a video camera/microphone tele-video conferencing device. In a similar manner to the CD-ROM, the ZV port devices may send audio directly to the codec audio controller without using DMA or I/O operations to transfer the audio information. Thus, the computer's power management system may incorrectly determine that the ZV port device and codec audio subsystem are not being used, and inadvertently interrupt the operation of the audio subsystem and ZV port device.

SUMMARY OF THE INVENTION

The present invention is a system and method for power management. An electronic system has an audio circuit which generates an analog audio output signal. A power management system for the electronic system is coupled to an activity detection circuit which senses audio signal activity on the analog audio signal. The power management system maintains power to at least the audio circuit when activity is detected on the analog audio circuit by the activity detection circuit. The power management system causes the audio circuit to enter a power conservation mode when no activity is detected by the audio detection circuit on the audio analog signal for a predetermined amount of time.

In a preferred embodiment, the electronic system is a computer system. In another preferred embodiment, the analog audio signal is an output of a peripheral.

In still another preferred embodiment, the activity detection circuit includes a comparator and the activity detection circuit detects activity by sensing variations in a voltage level of the analog audio output signal.

One aspect of the invention is a computer system, including a peripheral which generates an audio output signal. The computer system further includes a power management system, including a host processor, coupled to the peripheral and an activity detection circuit coupled to the audio output signal. The activity detection circuit senses audio signal activity on the audio signal independently of the host processor. The power management system is coupled to the audio detection circuit.

The power management system maintains power to at least the peripheral when the detection circuit detects audio activity on the audio output signal. The power management system suspends operation of the peripheral when the detection circuit detects no activity on the audio output signal for a predetermined amount of time.

In a preferred embodiment, the peripheral is a CD-ROM. In another preferred embodiment, the peripheral is a Zoom Video device. In yet another preferred embodiment, the activity detection circuit senses audio signal activity by detecting variations in a voltage level of the analog audio output signal.

Yet another aspect of the present invention is a computer system, including a host processor, which provides power management for the operation of an audio subsystem. An audio circuit generates a varying output voltage signal. An activity detection circuit is coupled to the output voltage signal. The activity detection circuit senses a change in voltage in the output voltage signal independently of the host processor. A power management circuit is coupled to the audio detection circuit, and the power management circuit maintains power to at least the audio circuit when the detection circuit senses a change in the output voltage within a predetermined amount of time.

A particularly advantageous aspect of the present invention is a method of managing power to an audio circuit in a computer system. The method includes the steps of providing power to a peripheral, sensing variations in a peripheral analog audio signal output, and suspending operation of the peripheral if the analog signal does not vary within a predetermined time period.

In a preferred embodiment, the sensing of variations in the peripheral analog audio output is done independently of a host processor.

Still another aspect of the present invention is a computer system, including a power management system for an audio circuit. The computer system includes a first and a second analog audio signal output of the audio circuit. The computer system also includes a first activity detection circuit for sensing audio signal activity on the first analog audio signal, and a second activity detection circuit for sensing audio signal activity on the second analog audio signal. At least one transition detection circuit is coupled to receive an output of the first activity detection circuit and is coupled to receive an output of the second activity detection circuit. The transition detection circuit generates an output which transitions upon a transition of either the first activity detection circuit output or the second activity detection circuit output. A controller is coupled to the output of the transition detection circuit. The controller maintains power to at least the audio circuit when the output of the transition detection circuit changes state at least once within a predetermined interval. The controller causes the audio circuit to be placed in a power conservation mode when the output of the transition detection circuit does not change state within the predetermined interval.

DETAILED DESCRIPTION OF THE PREFERRED EMBODIMENT

Figure 1:
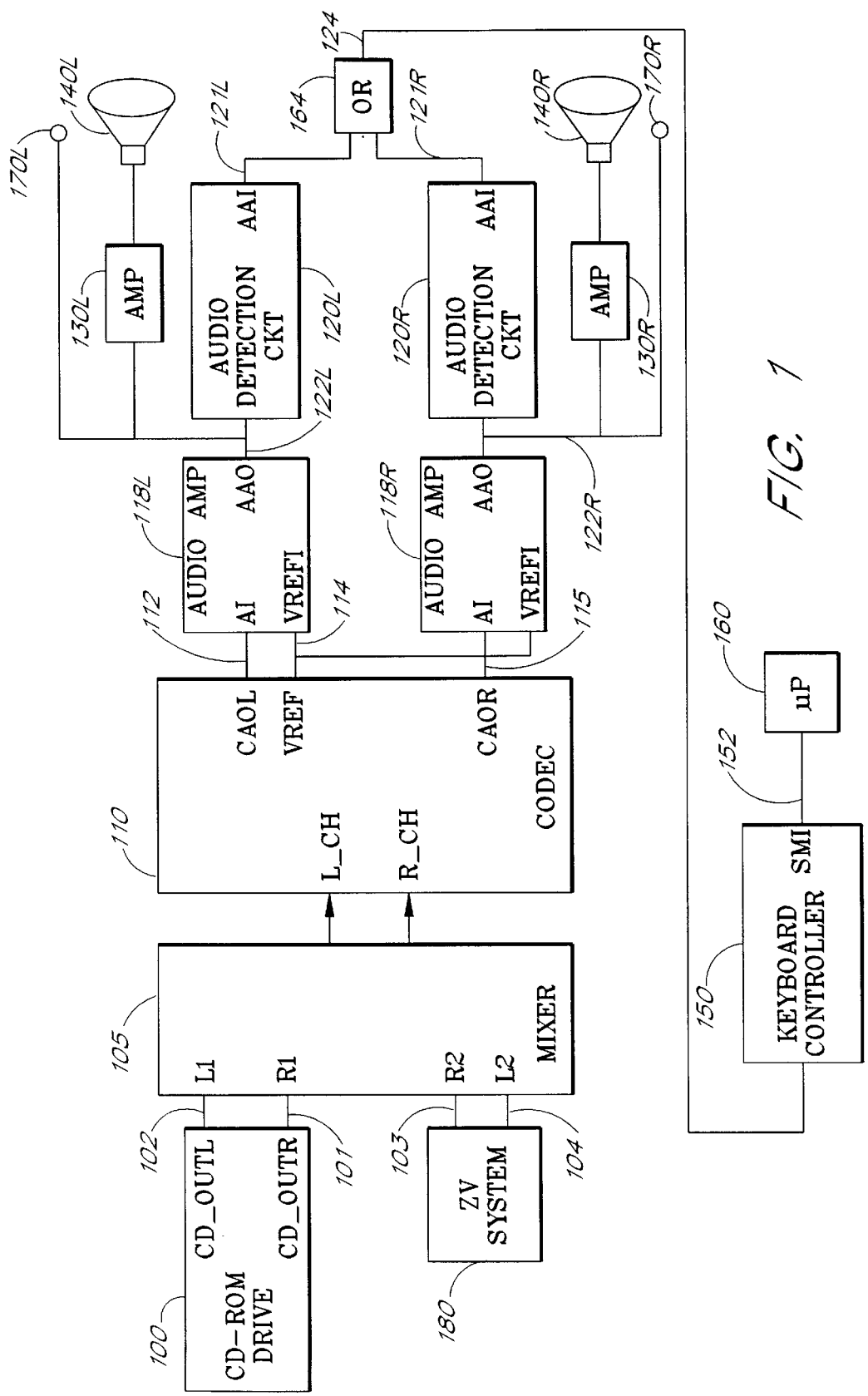
FIG. 1 is a block diagram illustrating the architecture of the present invention when used to detect audio activity resulting from playing an audio CD on a CD-ROM drive or when used to detect ZV audio.

FIG. 1 is a block diagram illustrating the architecture of the present invention when used to detect the audio activity resulting from playing an audio CD on a computer system's CD-ROM drive 100. The CD-ROM drive 100, which is capable of playing both CD-ROMs and audio CDs, has a left channel analog CD output CD_OUTL connected to an analog mixer 105 by a signal line 102 and a right channel analog CD output CD_OUTR connected to the analog mixer 105 by a signal line 101. CD-ROM drives are available from numerous manufacturers. When the CD-ROM drive 100 plays audio CDs, the CD-ROM drive 100 transmits analog audio signals representing the digital audio information stored on the audio CD over the signal lines 102, 101 which are received by the mixer 105.

The mixer 105 mixes the analog signals received on the signal lines 102, 101 with any other corresponding analog signals which are received on other input signal lines 103, 104. By way of example, the signals received on the signal lines 103, 104 are Zoom Video (ZV) left channel and right channel analog audio signals from a ZV system 180. The mixer 105 then outputs the resulting analog left and right channel signals to a codec 110. The codec 110 in turn outputs the resulting left and right channel audio signals on codec analog outputs CAOL, CAOR over signal lines 112, 115 to a corresponding Audio Input (AI) of a left channel audio amplifier 118L and a corresponding Audio Input (AI) of a right channel audio amplifier 118R. A voltage reference (VREF) output of the codec 110 is connected to a voltage reference input (VREFI) of the left and right channel audio amplifiers 118L, 118R by a signal line 114. As the use of codecs, such as those from Creative Labs, is well known in the art, no further details on the operation of the codec 110 will be given.

The audio amplifier circuits 118L, 118R buffer, filter and amplify the analog signals received from the codec 110. The resulting amplified audio signals are output on a corresponding Analog Audio Output (AAO) of the audio amplifier circuits 118L, 118R, and each AAO output is connected to a corresponding audio detection circuit 120L, 120R, a corresponding speaker amplifier 130L, 130R and a corresponding line-out connector 170L, 170R via respective signal lines 122L, 122R. The speaker amplifiers 130L, 130R then further amplify the audio signals, and the resulting amplified signals are connected to corresponding speakers 140L, 140R.

The audio detection circuit 120L detects audio signal activity on the AAO output of the audio amplifier 118L. In response to audio activity on the AAO output of the audio amplifier 118L, the audio detection circuit 120L changes the polarity of its Audio Activity Indicator (AAI) output, either from high-to-low, or from low-to-high to indicate audio activity is taking place. Similarly, the audio detection circuit 120R detects audio signal activity on the AAO output of the audio amplifier 118R. The operation of the audio detection circuits 120L, 120R will be described below in greater detail.

The AAI output of the audio detection circuit 120L on a line 121L and the AAI output of the audio detection circuit 120R on a line 121R are logically ORed together by an OR circuit 164. The output of the OR circuit 164 is connected to a keyboard controller 150 by a signal line 124. Alternatively, the output of the OR circuit 164 may be connected to the core logic (not shown), associated with the host microprocessor 160. The output of the OR circuit transitions from low-to-high when the outputs of both of the audio detection circuits 120L, 120R are low and then either or both outputs of the audio detection circuits 120L, 120R transition high. The output of the OR circuit 164 transitions from high-to-low when either one or both or the outputs of the audio detection circuits 120L, 120R are high and then the outputs of the audio detection circuits 120L, 120R transition so that both outputs of the audio transition circuits 120L, 120R are low. Thus, the OR circuit 164 provides an indication that audio activity is taking place on either the left or right audio channel. Other types of circuits can be used to sense any transition on the outputs of the audio detection circuits 120L, 120R, but an OR circuit configuration was chosen for the preferred embodiment because of its low cost. When the keyboard controller 150 detects a transition on the output of the OR circuit 164, the keyboard controller 150 generates an interrupt on a System Management Interrupt (SMI) output. The SMI output is connected to a host microprocessor 160 by a signal line 152. The microprocessor 160, in conjunction with firmware and related hardware, performs the power management system functions for the computer. As long as the microprocessor 160 receives SMI interrupts over the signal line 152, the microprocessor 160 will not suspend operation of the CD-ROM 100, or the codec 110. However, if the microprocessor 160 does not receive an SMI interrupt for a predetermined time period, such as, by way of example, 2 seconds, the microprocessor 160 will determine that no audio activity is occurring and may suspend the operation of the CD-ROM drive 100 and codec 110 to conserve power.

Figure 2:
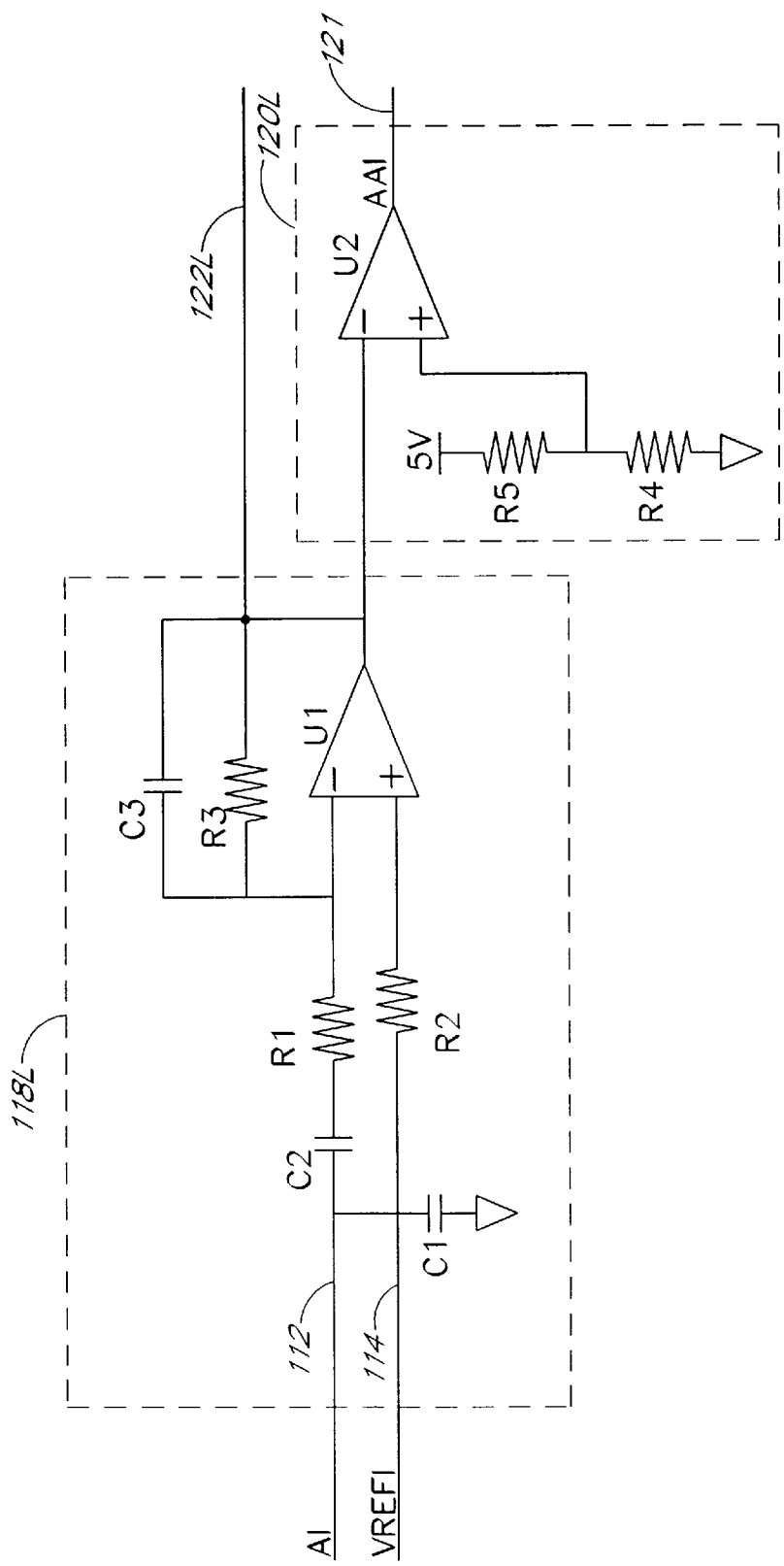
FIG. 2 is a detailed schematic of a preferred embodiment of the present invention as illustrated in FIG. 1.

A detailed schematic of the audio amplifier 118L and the audio detection circuit 120L is illustrated in FIG. 2. The audio amplifier 118R and the audio detection circuit 120R have circuit configurations which are identical to the audio amplifier 118L and the audio detection circuit 120L. However, if only mono audio is being used within the computer, then only one channel of audio detection and audio amplification circuitry would be required, and the OR gate function 164 would not be required. The signal line 112, connects the output CAO of the codec 110 via the audio input (AI) to a first terminal of a high frequency filter capacitor C1 and to a first terminal of an AC-coupling capacitor filter C2. A typical value for the capacitor C1 is 0.1 $\mu$F and a typical value for the capacitor C2 is 1.0 $\mu$F. A second terminal of the capacitor C2 is connected to a first terminal of a resistor R1. The resistor R1 has a second terminal connected to an inverting (-) input of an operational amplifier (op-amp) U 1, to a first terminal of a resistor R3, and to a first terminal of a capacitor C3. The capacitor C2 and the resistor R1 form a high-pass filter, while the capacitor C3 and the resistor R3 form a low-pass filter. A typical value for the resistor R1 is 15 k$\Omega$, a typical value for the resistor R3 is 22 K$\Omega$, and a typical value for the capacitor C3 is 220 pF. The op-amp U1 may be an MC33078 from Motorola, by way of example. A second terminal of the resistor R3 is connected to a second terminal of the capacitor C3 and to an output of the op-amp U1.

The signal line 114, carrying the voltage reference signal from the codec 110, is connected to a first terminal of a resistor R2 via the VREFI input. A second terminal of the resistor R2 is connected to a non-inverting (+) terminal of the op-amp U1. A typical value for the resistor R2 is 33 K$\Omega$.

The output of the op-amp U1 is connected to the signal line 122L and an inverting (-) input of a comparator U2 in the audio detection circuit 120L. The comparator may be a LM324 from National Semiconductor, by way of example. A resistor R5 has a first terminal connected to +5 VDC. A second terminal of the resistor R5 is connected to a non-inverting (+) input of the comparator U2 and to a first terminal of a resistor R4. A second terminal of the resistor R4 is connected to analog ground. The resistors R4, R5 form a voltage divider and provide a threshold voltage reference of approximately 2.0 VDC to the non-inverting input of the comparator U2. A typical value for the resistor R5 is 30.1 K$\Omega$, and a typical value for the resistor R4 is 20 K$\Omega$. The resistors R4, R5 have 1% tolerances to provide an accurate threshold voltage reference on the non-inverting input of the comparator U2. An output of the comparator U2 is connected to the signal line 121L which is connected to the OR circuit 164, as illustrated in FIG. 1.

The operation of the preferred embodiment of the audio activity detection circuit 120L will now be described.

The activity detection circuit 120L monitors activity on the left audio channel. The output of the comparator U2 transitions from a logic 'high' (approximately +5 VDC) to a logic 'low' (approximately 0 VDC) when the voltage at the inverting input of the comparator U2 varies from a voltage below the threshold voltage set by the resistors R4 and R5 at the non-inverting input of the op-amp U2, to a voltage above the threshold voltage set at the non-inverting input of U2. Similarly, the output of the comparator U2 transitions from a 'low' to a 'high' when the voltage at the inverting input of the comparator U2 varies from a voltage above the threshold voltage set by the resistors R4 and R5 at the non-inverting input of the comparator U2, to a voltage below the threshold voltage set at the non-inverting input of U2. Thus, whenever audio activity is occurring on the left channel, the output of the op-amp U1 varies from above/below 2.0 V to below/above 2.0 V. The variation of the output of the opamp U1 is detected by the comparator U2 which responds by transitioning its output from a first logic level to a second logic level. The result of this detection is then signaled to the OR circuit 164, which in turn signals the keyboard controller 150 over the signal line 124. The keyboard controller then signals the microprocessor 160 with a System Management Interrupt over the signal line 152. The microprocessor 160, in cooperation with power management firmware, refrains from suspending the operation of the CD-ROM 100 and the codec 110 as long as it receives an active System Management Interrupt on a frequent basis. If, on the other hand, the CD-ROM drive stops playing music from the audio CD, then the output of the op-amp U1 will not vary. Since the output of the op-amp U1 does not vary, then the output of the comparator U2 will not transition. If there is likewise no activity of the right audio channel, then similarly the output of the audio detection circuit 120R will not vary. If neither output of the audio detection circuits 120L, 120R has a transition, then the output of the OR circuit 164 will not transition. Hence, the keyboard controller 150 will not generate an interrupt to the microprocessor 160 and the microprocessor 160 may suspend operation of the CD-ROM drive 100 and codec 110 after a predetermined time.

Figure 3:
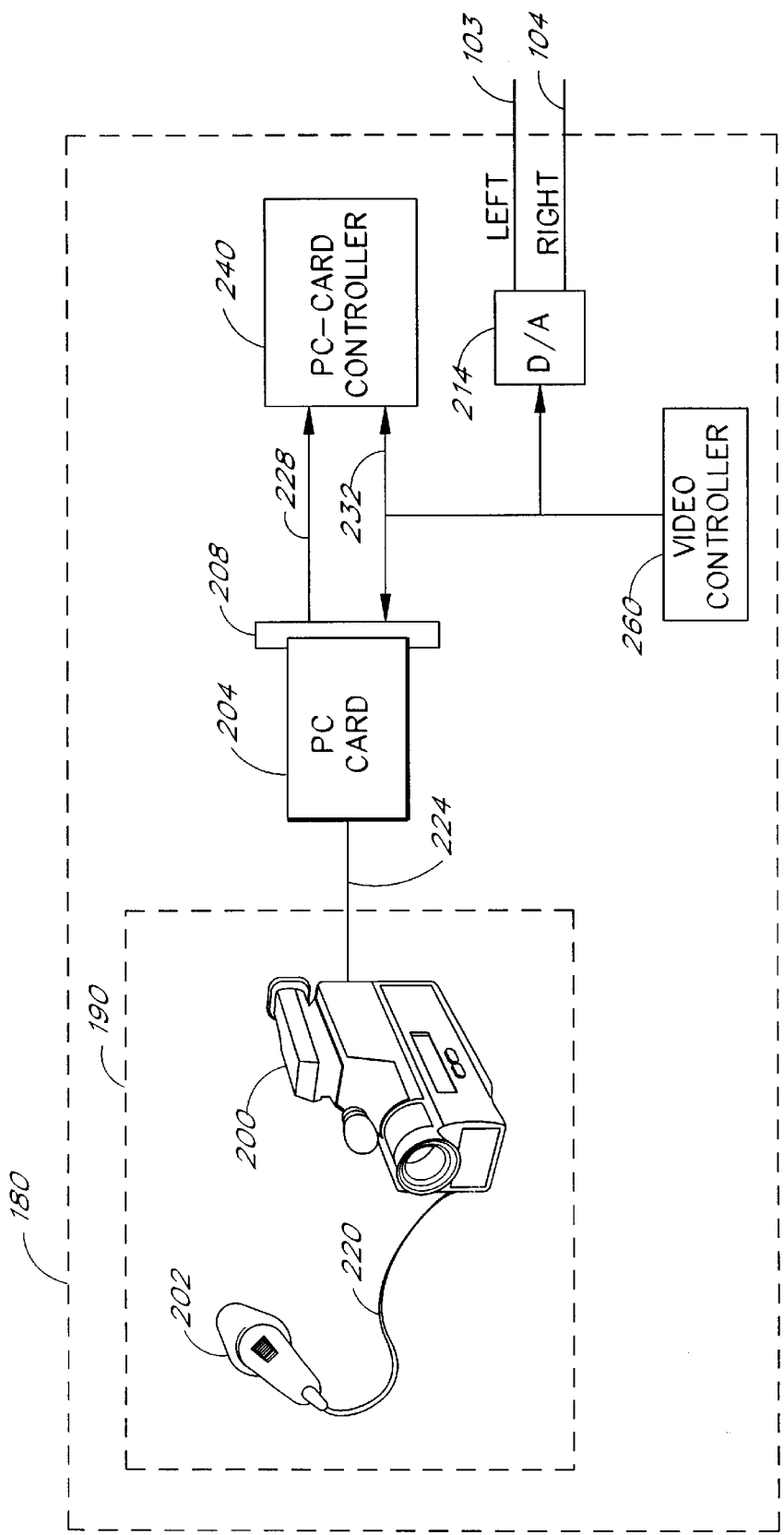
FIG. 3 is a block diagram illustrating a Zoom Video architecture and supporting circuitry.

FIG. 3 is a block diagram illustrating the ZV system 180, which along with FIG. 1, illustrates the ZV system 180 when used in cooperation with the present invention. A ZV input system 190 used for tele-video conferencing, includes a video camera 200 and microphone 202, and is connected to a PC Card 204. The PC Card 204 interfaces the ZV input system 190 to the computer when the PC Card 204 is plugged into a PC Card socket 208. The PC Card 204 provides digital audio and digital video information on a data bus 232. However, the PC Card controller 240 is bypassed, and the ZV digital audio signals are converted directly into analog audio signals by a digital-to-analog (D/A) converter 214. The D/A converter 214 outputs a left channel audio signal on the signal line 103 to the mixer 105, and similarly outputs a right channel audio signal on the signal line 104 to the mixer 105. As discussed above and as illustrated in FIG. 1, the outputs of the mixer 105 are connected to the codec 110, and the outputs of the codec 110 are connected to the audio amplifiers 118L, 118R. The audio detection circuits 120L, 120R monitor the corresponding AAO outputs of the audio amplifiers 118L, 188R for any transitions. As in the case of the CD-ROM, when transitions are detected, the audio detection circuits 120L, 120R signal the OR circuit 164. The OR circuit 164 then signals the keyboard control circuit 150, which in turn generates an interrupt to the microprocessor 160. The microprocessor 160 then performs the appropriate power conservation techniques, ensuring that the ZV system 180 is never inadvertently powered-down. A video controller 260 receives video data from the video camera 200 via the PC Card 204 in a conventional manner.

In an alternative embodiment (not illustrated) the ZV system 180 and the CD-ROM drive 100 each have their own independent pair of audio detection circuits and OR logic circuit. The audio detection circuits are connected to the respective outputs of the ZV system 180 and CD-ROM drive 100, before the CODEC 110. The OR logic circuit associated with the ZV 180 system generates an interrupt to the keyboard controller 150 when the ZV audio detection circuits signal that audio activity is occurring on the ZV system 180. Likewise, the OR logic circuit associated with the CD-ROM drive 100 generates an independent interrupt to the keyboard controller 150 when the CD-ROM audio detection circuits signal that audio activity is occurring on the CD-ROM 100. This technique provides a mechanism for the microprocessor 160 to distinguish if audio activity is occurring on the CD-ROM drive 100, the ZV system 180, or if audio activity is occurring on both the ZV system 180 and CD-ROM drive 100. Thus the microprocessor can appropriately place, independently, either the CDROM 100 or the ZV system 180 in a power conservation mode. Additionally, both the CD-ROM drive 100 and the ZV system 180 can be placed into a power conservation mode at the same time. This preferred embodiment offers enhanced flexibility, at the cost of additional hardware, compared to the preferred embodiment described above, which cannot distinguish between audio activity occurring on the CD-ROM drive 100 or on the ZV system 180.

The audio detection circuit can be used in many types of devices incorporating audio systems where power conservation is important, including electronic games, communication devices, and other electronic systems.

Although this invention has been described in terms of a certain preferred embodiment, other embodiments apparent to those of ordinary skill in the art are also within the scope of this invention. Accordingly, the scope of the invention is intended to be defined only by the claims which follow.

What is claimed is:

1. A power management system for an electronic system, said electronic system having an audio circuit which generates an analog audio signal on an output, said power management system coupled to an activity detection circuit which senses audio signal activity on said output and causes an interrupt signal having a first state and a second state to be generated to said power management system to indicate the status of said audio signal activity, said power management system responding to the first state of said interrupt signal by maintaining power to at least said audio circuit when activity is detected on said output by said activity detection circuit, and said power management system responding to said second state of said interrupt signal by causing said audio circuit to enter a power conservation mode when no activity is detected by said activity detection circuit on said output for a predetermined amount of time.

2. A power management system for an electronic system as defined in claim 1, wherein said electronic system is a computer system.

3. A power management system for an electronic system as defined in claim 1, wherein said analog audio signal is an output signal of a peripheral.

4. A power management system for an electronic system as defined in claim 1, wherein said activity detection circuit further comprises a comparator, said activity detection circuit detecting activity by sensing variations in a voltage level of said analog audio signal on said output.

5. A computer system, including a peripheral which generates an audio signal on an output, comprising:

a power management system, including a host processor, coupled to said peripheral;

an activity detection circuit coupled to receive said audio signal on said output, said activity detection circuit sensing audio signal activity on said output independently of said host processor and providing an interrupt to said power management system indicating audio signal activity and said power management system coupled to said audio detection circuit, said power management system maintaining power to at least said peripheral in response to said interrupt when said activity detection circuit detects audio activity on said, and said power management system suspending operation of said peripheral when said detection circuit detects no audio output signal activity on said output and does not provide an interrupt for a predetermined amount of time.

6. A computer system as defined in claim 5, wherein said peripheral is a CD-ROM drive.

7. A computer system as defined in claim 5, wherein said peripheral is a Zoom Video device.

8. A computer system as defined in claim 5, wherein said activity detection circuit senses audio signal activity by detecting variations in a voltage level of said analog audio signal on said output.

9. A computer system, including a host processor, providing power management for operation of an audio subsystem, comprising:

an audio circuit, said audio circuit generating a varying voltage signal as an output;

an activity detection circuit coupled to receive said voltage signal, said activity detection circuit sensing a change in voltage in said voltage signal independently of said host processor and causing an interrupt to be generated in response to changes in said voltage signal; and a power management circuit coupled to said interrupt signal, said power management circuit maintaining power to at least said audio circuit when said interrupt signal is generated within a predetermined amount of time.

10. A method of managing power to an audio circuit in a computer system, said method comprising the steps of:

(a) providing power to a peripheral;

(b) receiving an analog audio signal:

(c) filtering a first frequency and a second frequency of said analog audio signal to produce a filtered audio signal;

(d) comparing said filtered audio signal with a predetermined threshold:

(e) providing an indicator signal at a first state when said filtered audio signal rises above said threshold and providing said indicator signal at a second state when said filtered signal falls below said threshold, and (f) suspending operation of said peripheral if said indicator signal does not change between said first and second states within a predetermined time period.

11. A computer system, including a power management system for an audio circuit, comprising:

first and second analog audio signal outputs of said audio circuit;

a first activity detection circuit which senses audio signal activity on said first analog audio signal output, and a second activity detection circuit which senses audio signal activity on said second analog audio signal output;

at least one transition detection circuit coupled to receive a first detection output signal of said first activity detection circuit and coupled to receive a second detection output signal of said second activity detection circuit, said transition detection circuit generating an interrupt signal which transitions upon a transition of either said first detection output signal or said second detection output signal: and a controller responsive to said interrupt signal of said transition detection circuit, said controller maintaining power to at least said audio circuit when said interrupt signal is generated at least once within a predetermined interval, and said controller causing said audio circuit to be in a power conservation mode when said interrupt signal is not generated within said predetermined interval.

* * * * *

UNITED STATES PATENT AND TRADEMARK OFFICE
CERTIFICATE OF CORRECTION

PATENT NO. : 5,822,598

DATED : October 13, 1998

INVENTOR : Don T. Lam

It is certified that error appears in the above-identified patent and that said Letters Patent is hereby corrected shown below:

In column 7 at line 49, change "on said, and said" to --on said output, and said--.

In column 7 at line 44, change "activity and" to --activity; and--.

In column 7 at lines 50 and 51, delete the new line formatting that begins after "system" in line 50 so that the text that begins with "suspending operation" in line 51 and that continues through line 54 part of a single claim element that begins in line 45.

Signed and Sealed this

Fifteenth Day of May, 2001

*Attest:*

NICHOLAS P. GODICI

*Attesting Officer*   *Acting Director of the United States Patent and Trademark Office*